No. 693,724. Patented Feb. 18, 1902.
W. H. LEDBETTER.
SEED PLANTER.
(Application filed May 18, 1901.)

(No Model.) 4 Sheets—Sheet 2.

Witnesses:
Inventor
William H. Ledbetter
By James L. Norris
Atty.

No. 693,724. Patented Feb. 18, 1902.
W. H. LEDBETTER.
SEED PLANTER.
(Application filed May 18, 1901.)
(No Model.)
4 Sheets—Sheet 3.

Witnesses:

Inventor
William H. Ledbetter
By James L. Norris
Atty.

THE NORRIS PETERS CO., PHOTO-LITHO., WASHINGTON, D. C.

UNITED STATES PATENT OFFICE.

WILLIAM H. LEDBETTER, OF DALLAS, TEXAS.

SEED-PLANTER.

SPECIFICATION forming part of Letters Patent No. 693,724, dated February 18, 1902.

Application filed May 18, 1901. Serial No. 60,895. (No model.)

*To all whom it may concern:*

Be it known that I, WILLIAM H. LEDBETTER, a citizen of the United States, residing at Dallas, in the county of Dallas and State of Texas, have invented new and useful Improvements in Seed-Planters, of which the following is a specification.

This invention relates to seed-planters, and has for its objects, first, to provide novel, simple, and efficient mechanism for dropping the seed one at a time and at different spaces apart in the row; second, to provide an improved force-feed which will operate to discharge the seed with certainty; third, to provide improved means whereby the machine may be quickly altered to adapt it for dropping seed of different kinds or sizes; fourth, to provide improved means for covering the seed and rolling or packing the soil in rows, and, lastly, it has for its object to improve and simplify the construction and render more efficient and certain the operation of this class of machines generally.

To these ends my invention consists in the features and in the construction, combination, and arrangement of parts hereinafter described, and particularly pointed out in the claims following the description, reference being had to the accompanying drawings, forming a part of the specification, wherein—

As herein shown and described, the machine is especially designed for planting cotton and other seed, as will be hereinafter explained.

Referring to the drawings, the numeral 1 indicates an approximately semispherical or cup-shaped casing which constitutes a housing for inclosing and protecting the operative gearing of the machine and is provided at its upper edge with a preferably integral flat ring 2, perfectly circular in shape and having for its center a point 3, which is eccentric to or in rear of the center of the casing 1. The point 3 falls within the center of a bridge or cross-bar 12, which is countersunk at its ends in the ring 2 and is rigidly fastened thereto by bolts 4, which also serve to secure to the bottom of the ring two angle-irons or brackets 5, by means of which the ring 2 is secured to the framework of a planter or to the beams of a cultivator, as will hereinafter appear. The rear edge of the ring 2 is recessed or cut away, as at 6, and extending from one end of said recess or cut-away portion on one side of said ring to a point intermediate the front and rear of the ring is a segmental flange 7.

Cast on or secured to the front half of the periphery of the ring 2 is a crescent-shaped flange 8, that extends around approximately one-half the front edge of the ring and projects slightly above the upper side of said ring in the manner and for the purpose presently explained. Formed on the outer edge of the flange 8 are vertical lugs 9, and disposed above said flange and the ring 2 is a cylindrical hopper 10, the lower forward edge of which fits around the outer edge of the flange 8 and between the latter and said lugs, while its rear edge overhangs the rear portion of the ring 2. Brackets or braces 11 are preferably fastened to the opposite sides of the hopper and to the under side of the ring 2 and serve to rigidly support the hopper in position.

From the foregoing it will be seen that the casing and hopper are concentric with one another; but they are eccentric to the upper ring portion of the base which carries the dropping-ring. In other words, the center of the dropping-ring is in rear of the center of a line drawn through the centers of the hopper and casing, as will more fully hereinafter appear.

Figure 8:
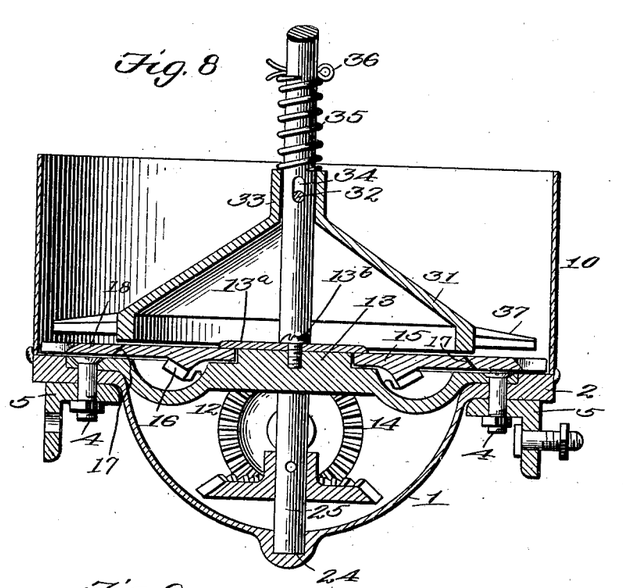
Fig. 8 is a transverse vertical sectional view of the seed-dropping mechanism.
Figure 9:
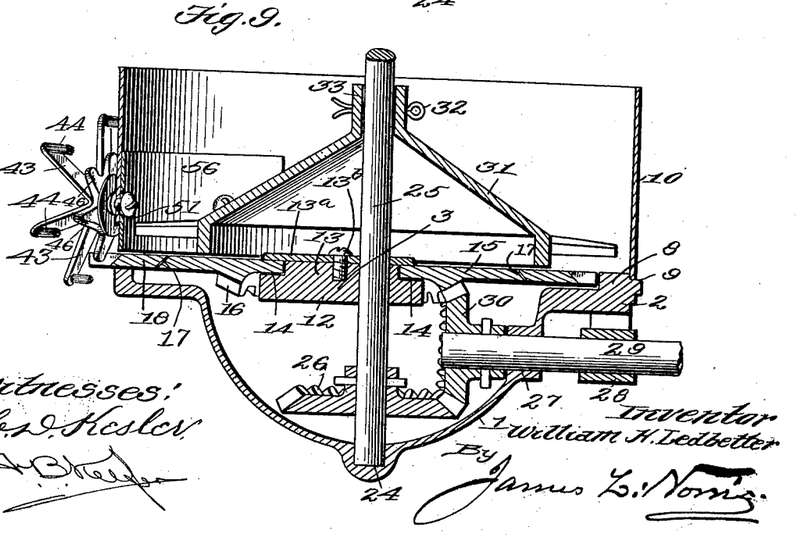
Fig. 9 is a similar view taken at a right angle to Fig. 8.
Figures 10, 11, 12, 13, 14:
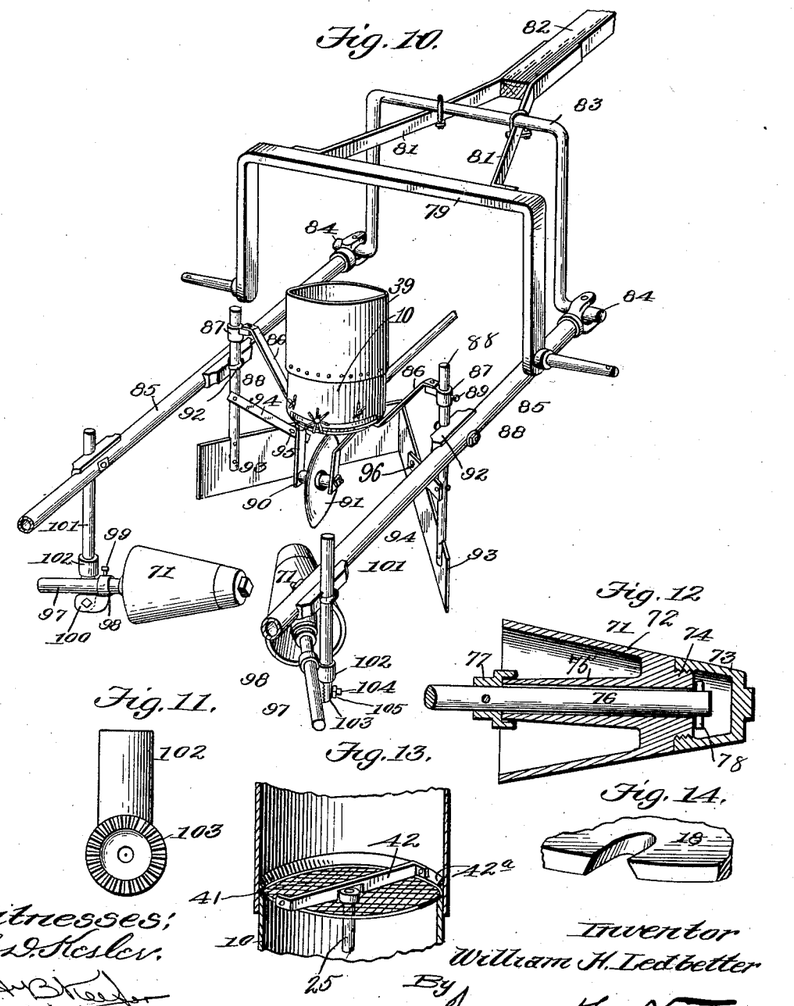
Fig. 10 is a perspective view showing the seed-dropping mechanism applied to the beams of a cultivator.
Fig. 11 is a detail view of the lower end of one of the standards for supporting the covering-rollers.
Fig. 12 is a sectional view of one of the covering-rollers.
Fig. 13 is a detail view illustrating a modified form of sifting mechanism.
Fig. 14 is a detail view illustrating a modified form of seed slot or receptacle.

Formed or fixed centrally on the upper side of the bridge or cross-bar 12 is a circular boss or journal 13, and loosely arranged about said boss and supported on a circular bearing 14, formed on the bridge about the base of the boss, is a disk 15, on the under side of which is formed a beveled gear 16. A disk 13$^a$ is secured to the upper side of the boss 13 by a screw 13$^b$ and overlaps the disk 15 to hold the latter and the gear 16 down in place. The periphery of the disk 15 is upwardly and inwardly beveled, as at 17, as shown in Figs. 8 and 9, and loosely fitted about said disk is a seed-dropping ring 18, the inner circumference of which is downwardly and outwardly beveled to correspond with and fit over the beveled periphery of the disk 15. On the periphery of the disk 15 is formed one or more tongues 19, which fit into slots or recesses 20, formed in the inner circumference of the seed-dropping ring, whereby the disk and said ring are caused to rotate together, while at the same time permitting the seed-dropping ring to be readily removed. Formed in the peripheral portion of the seed-dropping ring at equal distances apart are radial slots 21, the side walls of which are preferably parallel and inclined at an angle of approximately forty-five degrees to the upper and lower sides of said ring, as at 22, said walls inclining rearwardly and downwardly relatively to the direction in which the seed-dropping ring rotates. The inner end wall of each of said slots is inclined upwardly and inwardly, as at 23, for the purpose hereinafter explained. Each of the slots 21 is of approximately the size to contain a single cotton-seed. Instead, however, of forming the side walls of the slots parallel and inclining them rearwardly said side walls may be formed to diverge from the upper toward the lower side of the seed-dropping ring, as shown in Fig. 14 of the drawings, whereby said slots flare or increase in width from their upper to their lower sides, so that the dropping of the seed is facilitated. In practice, however, I may make the side walls of the slots perpendicular; but for the reasons hereinafter stated it is preferred to incline said walls rearwardly in parallelism, as before described. As before stated, the boss 13 is fixed eccentrically to the casing 1 and hopper 10 or in rear of the center of the latter, and hence the seed-dropping ring 18 will project from under the rear side of the hopper 10 and will register with the ring 2. The seed-dropping ring rotates upon or in close proximity to the ring 2, and at the rear of the hopper the slotted periphery of said ring projects over the recessed or cut-away portion of the ring 2, while in the forward portion of the hopper it rotates in close proximity to the inner side of the crescent-shaped flange 8, the upper face of said flange lying in the same horizontal plane with the upper side of the seed-dropping ring and the disk 15.

Formed centrally in the bottom of the casing 1 is a step-bearing 24, in which is stepped a vertical shaft 25, which is also journaled eccentrically in the bridge or cross-bar 12 and the boss 13 and extends centrally up into the hopper 10. As shown, the shaft 25 is eccentric to the disk 15 and seed-dropping ring 18, or, in other words, it is journaled forward of the center of the bridge and the boss and has fixed on its lower end a beveled gear-wheel 26.

Formed in the forward side of the casing 1 is a bearing 27, and pendent from the forward portion of the ring 2 is a bracket-bearing 28, and in said bearings is journaled a horizontal shaft 29, on the inner end of which is fixed a beveled gear-wheel 30, that gears with the gears 16 and 26 and operates to rotate the shaft 25 and the disk 15 and seed-dropping ring 18 in opposite directions. The shaft 29 may be driven by any suitable means connected with one of the wheels of the planter or cultivator on which the seed-dropping mechanism is mounted, as usual, and as such driving mechanism forms no part of the present invention the same is not illustrated. A differential gear, however, should be employed with the driving mechanism to plant the seed at different spaces apart in the row, as will hereinafter be referred to.

Mounted on the upper part of the shaft 25, above the disk 15 and the seed-dropping ring, is a conical disk 31, which is caused to rotate with said shaft by means of a cotter-pin 32, that passes through the upper sleeved end 33 of the conical disk and through an elongated aperture 34, formed transversely in the shaft, whereby the disk is permitted to move vertically for a limited distance. A coiled spring 35 is arranged on the shaft and bears at its lower end against the sleeved end 33 of the disk and at its upper end against a pin 36, passed through the shaft, said spring operating to hold the lower end of the disk 31 normally in proximity to the gear-disk 15 and the seed-dropping ring. Projecting radially from the lower edge of the conical disk 31 are horizontal arms 37, which operate to stir the seed and work them into the seed slots or receptacles; but to insure all the seed-slots being filled and no "skips" being made in planting I attach to a plurality of the radial arms flat metallic blades or leaf-springs 38, which I term "shoes," that are adapted to sweep over and in contact with the upper side of the seed-dropping ring and the crescent-shaped flange 8, said blades, owing to the eccentricity of the disk 31 and the seed-dropping ring, sweeping over the slots 21 and in contact with both the seed-dropping ring and the crescent-shaped flange during a portion of their revolution, and during another portion of their revolution said blades sweep over the seed-dropping ring only and inside of said slots. These blades operate to sweep and press the seed into the seed-slots 21, as will more fully hereinafter appear.

Fitted on the upper end of the seed-hopper 10 and secured thereto in any suitable manner is a feed-hopper 39, in the lower end of which is fixed a screen 40. The upper end of the shaft 25 projects centrally through the screen 40 and has fixed thereon a hub 41, carrying a plurality of stirrer-arms 42, which are arranged to revolve in proximity to the screen. The cotton-seed is poured into the feed-hopper 39, and the stirrer-arms operate to agitate the seed and loosen them up, the clean seed dropping into the seed-hopper below and the screen holding back the trash and the like.

Instead of the arrangement just above described a screen 41 may be fixed on the shaft 25 (see Fig. 13) and a cross-bar or spider 42 be fixed to the lower end of the feed-hopper 39, and in such case the cross-bar or spider will remain stationary and the screen will revolve, the cross-bar or spider performing the function of the stirrer-arms before described. In such an arrangement I prefer to fix an inwardly-flaring annular flange 42ª in the lower end of the feed-hopper 39, immediately above the screen, to prevent the seed from lodging between the periphery of the screen and the hopper.

Journaled in rear of the lower end of the seed-hopper is a rotary reel or clearer comprising a plurality of radial arms 43, each provided at its outer end with a brush 44, which projects at right angles to the arms toward toward the seed-hopper, or instead of brushes I may employ pins or their equivalents. The reel 43 is sleeved on the hub 45 of a spur-wheel 46, the outer end of which is threaded and has secured thereon a nut 47, which is arranged to bear against the reel and lock the latter and the spur-wheel together. The hub 45 of the spur-wheel is loosely journaled on a hollow headed stud 48, through which passes a bolt 51. The headed end of the bolt 51 also passes through the rear lower portion of the feed-hopper and has screwed on its outer end a nut 52, which is adapted to be screwed up against a washer 53, arranged on the bolt between the nut and the outer end of the stud. The face of the head 49 of the hollow stud is beveled or inclined, as shown, and bears against the exterior of the seed-hopper, whereby when the nut 52 is screwed up tight the head of the bolt 51 and the head 49 of the stud firmly clamp the wall of the hopper between them, and owing to the beveled face of the head 49 the stud 48, on which the reel and spur-wheel revolve, is caused to project at an angle from the hopper instead of radially therefrom. The arms or teeth of the reel and spur-wheel are so disposed that as the seed-dropping ring rotates the teeth of the spur-wheel successively engage the slots or seed-receptacles 21, from which the seed have been previously discharged, and the spur-wheel, and with it the reel, is thus rotated. As the reel rotates its brushes 44 successively pass down through the slots 21 as they emerge from behind the flange 7 and pass over above the recess or cut-away portion of the ring 2 and sweep the seed from out of the slots, thus insuring each slot or seed-receptacle discharging its contents. As the seed are discharged they drop into a seed chute or spout 54, which deposits the seed in the soil, which is opened in advance of the chute or spout by a plow or cultivator-shovel, as usual. By mounting the spur-wheel and reel in the manner described—that is to say, by arranging the axis of the reel at an angle instead of radially to the hopper—the brushes sweep through the seed-slots as the latter emerge from behind the flange 7; but as they ascend on the other side of the axis of the reel they clear the ring 2 and the seed-dropping ring; but in practice I may leave off the brush-reel and allow the spur-arms to punch the seed out as they travel through the seed-slots. In this instance the ends of the spur-arms should be made broad and flat to fit the seed-slots. By inclining the walls of the seed-slots in the manner described the seed easily slide into place in the slots, and one side of each slot is slightly overlapped by the other side of the slot, which tends to prevent other seed in the hopper from pulling the seed out of the slots by the adhering lint. So, also, by inclining the inner ends of the slots upwardly and inwardly, as shown, should two seed be crowded into one of the seed-slots one of them as the slot passes under the rear side of the hopper will be pushed radially inward by the hopper and will ride up said incline out of the slot, thus permitting the slot to carry but a single seed outside of the hopper. By arranging the hopper 10 and the seed-dropping ring eccentrically, as shown, the seed-dropping ring carries the seed and discharges them outside the hopper, at which point the reel operates to eject them from the slots and in such manner that the operation of the machine is always in plain view of the attendant. The flange 7 serves to prevent the seed from escaping from the seed-slots until they reach the recessed or cut-away portion of the ring 2 in position to drop into the seed chute or spout 54. The crescent-shaped flange 8 operates as an extension to the seed-dropping ring, so that as the blades 38 revolve in the forward portion of the hopper the said flange closes the outer ends of the seed-slots and prevents the seed from entering or escaping from said ends and also forms with the seed-dropping ring a smooth surface for the blades 38 to sweep over. The disk 31 and arms 37 rotate in an opposite direction to the seed-dropping ring, which causes the blades 38 to revolve in the direction in which the walls of the seed-slots are inclined, thus facilitating the entrance of the seed into the seed-slots. The conical disk 31 operates to spread the seed and throw them out toward the periphery of the hopper in position to be engaged by the blades 38, and the arms 37 operate to stir or agitate the seed and cause them to separate. The disk 31 may be provided with any number of arms desired, and any desired number or all of said arms may be provided with blades 38.

It will be obvious that the seed-dropping ring may be readily removed by merely lifting it from out its seat on the gear-disk 15, and in practice I provide a plurality of seed-dropping rings, each having seed-slots differing in number and in size from the seed-slots in the other rings, whereby by removing one ring and substituting another the machine may be adapted to seeds of different sizes or different kinds of seeds. It will also be obvious that the faster the dropping-rings are rotated relatively to the speed of the forward travel of the machine the closer the seed will be deposited in the drill, and, inversely, the slower they are rotated the farther apart the seed will be planted, and this variation of speed may be effected by the differential gearing before referred to, but which is not shown, as the same forms no part of the present invention.

Inasmuch as the different rings differ in thickness from one another, it becomes necessary to vary the distance between the lower edge of the rear portion of the hopper and the upper side of the ring 2, and this is accomplished by cutting away the rear lower portion of the hopper and by covering said cut-away portion with a segmental strip 56 of sheet metal. The strip 56 and the hopper are provided with coincident vertical slots 57, and passing through said slots are bolts 58, over the outer ends of which are screwed thumb-nuts 59. By loosening the thumb-nuts the strip 56 may obviously be adjusted vertically to cause its lower edge to lie in close proximity to the upper side of the seed-dropping ring. The strip 56 serves as a cut-off to prevent the seed in the hopper from escaping between it and the upper side of the seed-dropping ring. As before described, the spring 35 permits the disk 31 to move vertically on the shaft 25 in order to permit the blades or spring-shoes 38 to ride over obstructions or abnormally large seeds, and the blades or spring-shoes are adapted to perform the same function as they sweep over the seed, either or both of which insures a safeguard against cracking the seed.

Figure 1:
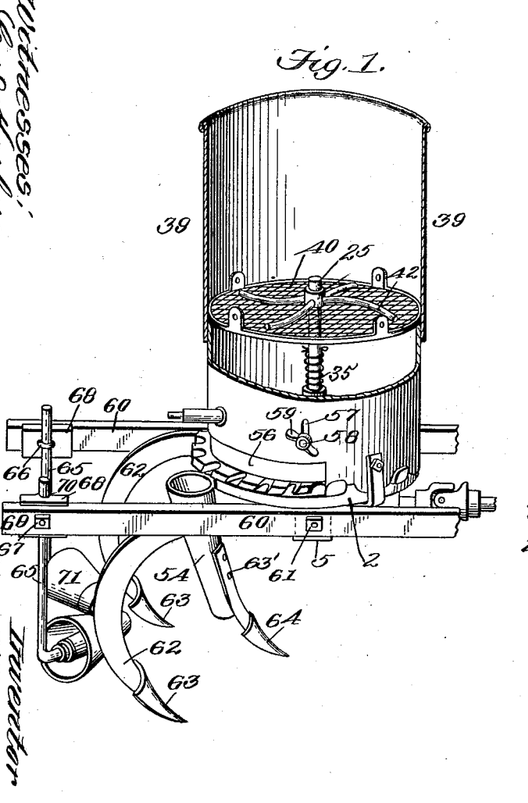
Figure 1 is a perspective view of my improved planter, a portion of the hopper being broken away.
Figures 2, 3:
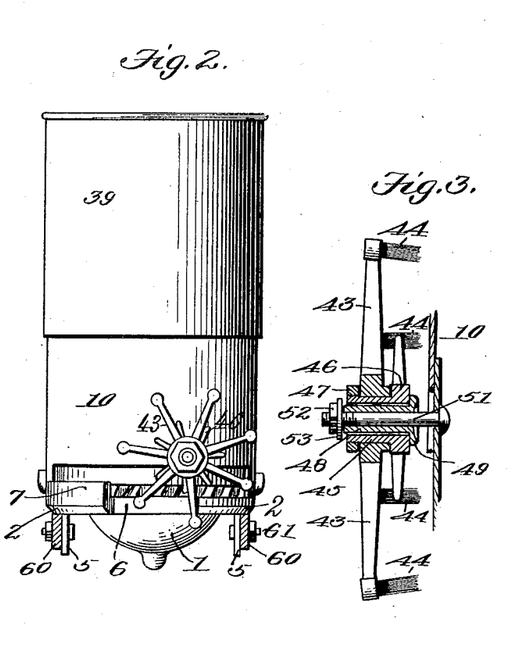
Fig. 2 is a rear view.
Fig. 3 is a detail sectional view of the mechanism for brushing out the seed from the seed-dropping ring.
Figure 4:
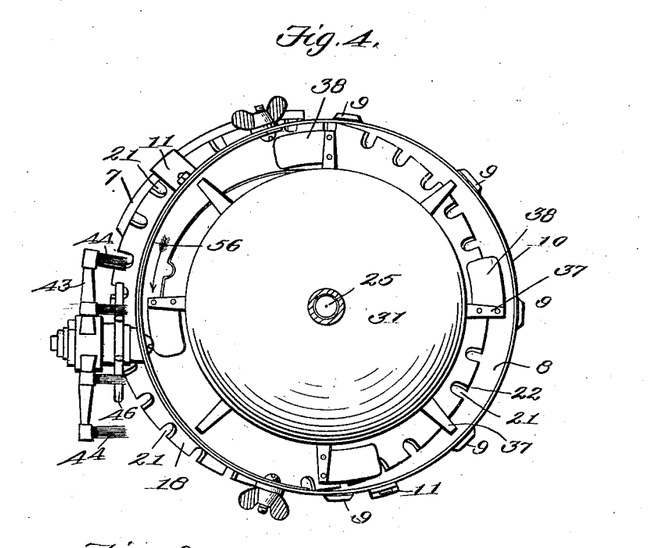
Fig. 4 is a top plan view of the seed dropping and ejecting mechanism.
Figures 5, 6, 7:
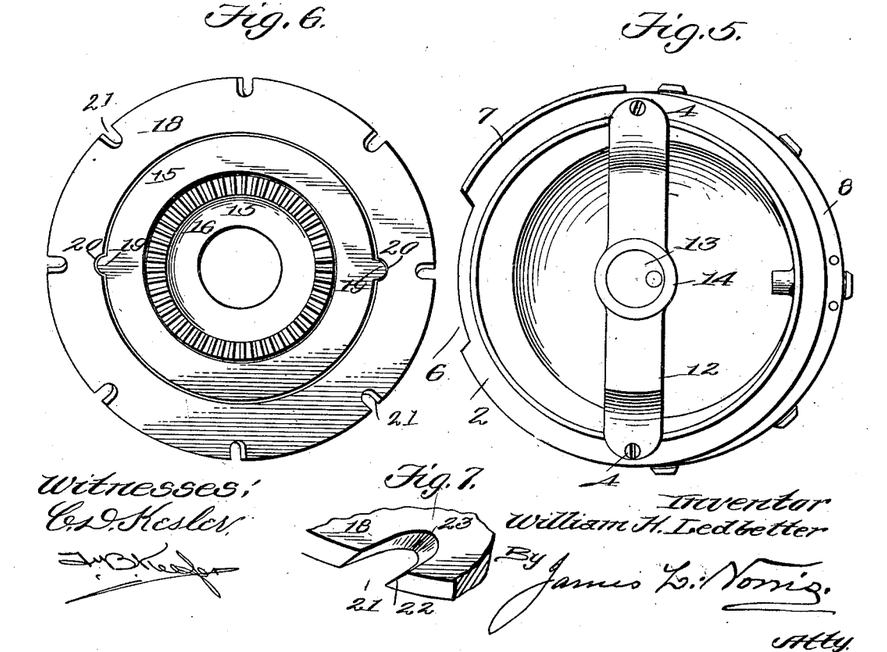
Fig. 5 is a bottom plan view of the base-ring and the bridge-piece or cross-bar.
Fig. 6 is a bottom plan view of the gear-disk and seed-dropping ring.
Fig. 7 is a detail perspective view illustrating one of the seed slots or receptacles.

In Figs. 1 and 2 of the drawings I have shown the seed-dropping mechanism secured to the frame of a planter of ordinary construction by means of the angle-irons or brackets 5, said brackets being attached to the beams 60 of the planter by bolts 61. Also bolted to said beams are standards 62, carrying at their lower ends shovels 63. A standard 63' is also secured in front of the seed chute or spout 54 and carries a shovel 64, which operates to open the soil to receive the seed. After the seed have been deposited in the furrow opened by the shovel 64 they are covered by the following mechanism.

Referring to Figs. 1 and 2, the numeral 65 indicates two rods or standards, which are each attached to the beams 60 by an eyebolt 66, that passes through the beam and has screwed on its outer end a nut 67. Said bolt also passes through a plate 68, that is provided at its upper and lower ends with lateral flanges 69, which overlap the upper and lower edges of the beam, the face of said plate being grooved vertically, as at 70, to form a seat for the standard. The standards lie in the grooves 70 and pass through the eyes of the bolts 66, and by screwing up the nuts 67 tightly the standards are held rigidly in place. The lower ends of the standards are bent inward toward one another at right angles, and on said horizontally-bent portions are journaled two rollers 71, each having the shape of a truncated cone. As shown, the smaller ends of the rollers are disposed inwardly or adjacent to one another, and the L-shaped standards are so turned and held that the small end of one of said rollers projects in front of the small end of the other roller, the axis of the rollers being arranged at approximately a right angle. After the seed have been deposited in the soil they are covered by the rollers 71, which drag the soil over the seed and pack and roll it down upon the row, and as one roller travels in advance of the other in the manner described the rear roller overlaps the track of the front roller, which insures every part of the row being rolled and packed down. By loosening the bolts 66 the rollers may be adjusted to any desired angle and may also be adjusted to any desired height. The rollers 71 are each preferably made in two sections 72 and 73, Fig. 12, the end section 73 being screwed to a threaded extension 74 on the end of the other section 72, forming the base of the cone. The portion 72 of the roller is provided with an internal sleeve 75, that is rotatably mounted on the bent portion or spindle 76 of its sleeve 75. A flanged collar 77 is fixed on the spindle 76 and fits over the inner end of the sleeve 75, while the end of the spindle projects through the end of the sleeve or the threaded extension thereof and into the hollow portion 73 of the roller, a pin 78 being passed transversely through the end of the spindle to keep the roller in place thereon. The collar 77 and hollow end portion of the roller prevent the entrance of dust and dirt between the sleeve and spindle. The rollers may, if desired, be covered with leather, rawhide, or other similar material.

When it is desired to use the machine for planting corn, the upper hopper 39, the screen 40, and the stirrer-arms 42 are removed, as are also the reel 43 and spur-wheel 46, as these parts are not employed when planting corn. The cut-off 56 is then raised, the disk 31 and cotton-seed-dropping ring are removed, and a seed-dropping ring having slots 21 suitable for the reception of grains of corn is fitted to the gear-disk 15, after which the disk 31 is replaced and the cut-off adjusted so that its lower edge will lie in close proximity to the upper side of the corn-dropping ring, when the machine will be in readiness for planting corn. If desired, the pin 32 may also be removed, so that the disk 31 will be free to rotate with the dropping-ring and gear-disk.

In Fig. 10 of the drawings I have shown my improved seed-dropping mechanism applied to the frame of a cotton-chopper, for which I obtained Letters Patent of the United States on the 9th day of May, 1899, No. 624,829. Referring to said figure of drawings, the numeral 79 indicates an arched axle on the spindles of which are journaled ground-wheels. Attached at their rear ends to the axle 79 are the sides 81 of the cultivator-frame, which converge toward each other and at their forward ends are bolted to the rear end of the tongue 82. Supported on the side pieces 81 is an arched beam 83, the lower ends of which are bent laterally outward, as at 84, and to said bent ends 84 are attached the forward ends of two cultivator-beams 85. The seed-dropping mechanism before described is supported between the cultivator-beams by bracket-arms 86, that are bolted at their inner ends to the bottom of the ring 2 and at their outer ends are provided with sleeves 87, that are fitted over the upper ends of standards 88 and are secured thereto by set-screws 89. The inner ends of the bracket-arms are bent downward and twisted slightly to form bearings for a shaft 90, on which is mounted a plow-disk 91, the twisted ends of the bracket-arms giving the required angle to the disk to cause the latter to throw the soil to one side and from in front of the seed spout or chute. The standards 88 are secured to the cultivator-beams by clips 92, and to the lower ends of said standards is bolted a V-shaped sweep 93, that is also braced to the standards by brace-bars 94. The forward ends of the brace-bars 94 are slotted, as at 95, through which the attaching-bolts 96 pass, so that by loosening the bolts 96 the forward end of the sweep may be adjusted vertically, so as to level the row or leave it in a ridge. In this arrangement the rollers 71 are journaled on shafts or rods 97, about which are secured collars 98 by set-screws 99, and on each of the collars 98 is formed a corrugated boss 100. Standards 101 are clipped to the cultivator-beams, and on the lower end of each standard is fastened a collar 102, provided with a corrugated boss 103, which is fitted against the boss 100 and secured thereto by a bolt 104 and nut 105. By loosening the bolts 104 the points of the rollers may be adjusted up or down to give to the ridge formed by the rollers the desired shape.

The driving-shaft 29 may be driven from one of the ground-wheels (not shown) in any suitable manner—as, for example, by the mechanism shown in my said Patent No. 624,829—and the driving mechanism is not herein shown, as the same forms no part of the present invention.

I do not limit my invention to the exact details of construction herein shown and described, but reserve the right to make any minor changes in its construction to any degree within the knowledge of skilled mechanics without departing from the spirit of the invention.

Having described my invention, what I claim is—

1. In a seed-planter, the combination with a hopper and a base therefor, of a rotary seed-dropping ring mounted in the bottom of the hopper and provided on its periphery with radial seed slots or receptacles having inclined side walls, substantially as described.

2. In a seed-planter, the combination with a hopper and a base therefor, of a rotary seed-dropping ring mounted in the bottom of the hopper and provided on its periphery with radial seed slots or receptacles having parallel side walls inclined downwardly and rearwardly relatively to the direction in which the seed-dropping ring rotates, substantially as described.

3. In a seed-planter, the combination with a hopper and a base therefor, of a rotary seed-dropping ring mounted in the bottom of the hopper and provided on its periphery with radial seed slots or receptacles having inclined side walls and upwardly and inwardly inclined inner end walls, substantially as described.

4. In a seed-planter, the combination with a hopper and a base therefor, of a rotary seed-dropping ring eccentrically mounted in the bottom of the hopper and provided on its periphery with radial seed slots or receptacles having inclined side walls and upwardly and inwardly inclined inner end walls, rotary stirrer-arms carrying spring-shoes arranged to sweep over said seed-slots, and means for rotating the seed-dropping ring and stirrer-arms in opposite directions, substantially as described.

5. In a seed-planter, the combination with a hopper and a base therefor, of a rotary seed-dropping ring eccentrically mounted in the bottom of the hopper and provided on its periphery with radial seed slots or receptacles having upwardly and inwardly inclined inner end walls, rotary stirrer-arms eccentrically mounted above the seed-dropping ring and carrying spring-shoes arranged to sweep over said seed-slots, and means for rotating the seed-dropping ring and stirrer-arms in opposite directions, substantially as described.

6. In a seed-planter, the combination with a hopper and a base therefor, of a rotary seed-dropping ring eccentrically mounted in the bottom of the hopper and provided on its periphery with radial seed slots or receptacles, said seed-dropping ring being arranged to project through one side of the hopper, rotary stirrer-arms eccentrically mounted above the seed-dropping ring and carrying spring-shoes arranged to sweep over said seed-slots, and means for rotating the seed-dropping ring and stirrer-arms in opposite directions, substantially as described.

7. In a seed-planter, the combination with a hopper and a base therefor, of a rotary seed-dropping ring eccentrically mounted in the bottom of the hopper and projecting through the rear side of the latter, said seed-dropping ring being provided on its periphery with radial seed slots or receptacles, rotary stirrer-arms concentrically mounted in the hopper above the seed-dropping ring and carrying spring-shoes arranged to sweep over said seed-slots, and means for rotating the seed-dropping ring and stirrer-arms in opposite directions, substantially as described.

8. In a seed-planter, the combination with a hopper and a base therefor, of a rotary seed-dropping ring eccentrically mounted in the bottom of the hopper and provided on its periphery with radial seed slots or receptacles, of a conical disk concentrically mounted in the hopper above the seed-dropping ring and provided with radial stirrer-arms provided with spring-shoes arranged to sweep over the seed-slots, and means for rotating the seed-dropping ring and the conical disk in opposite directions, substantially as described.

9. In a seed-planter, the combination with a hopper and a base therefor, of a rotary seed-dropping ring eccentrically mounted in the bottom of the hopper and provided on its periphery with radial seed slots or receptacles, of a vertically-movable conical disk concentrically mounted in the hopper above the seed-dropping ring and provided with radial stirrer-arms having fixed on some of them spring-shoes arranged to sweep over the seed-slots, a spring operating to normally hold down the conical disk, and means for rotating the seed-dropping ring and conical disk in opposite directions, substantially as described.

10. In a seed-planter, the combination with a hopper and a base therefor, of a rotary seed-dropping ring eccentrically mounted in the bottom of the hopper and provided on its periphery with radial seed slots or receptacles, of a vertically-movable conical disk supported above but out of contact with the seed-dropping ring and provided with radial stirrer-arms having fixed thereon spring-shoes arranged to sweep over the seed-slots, a spring operating to normally hold down the conical disk, and means for rotating the seed-dropping ring and conical disk in opposite directions, substantially as described.

11. In a seed-planter, the combination with a hopper and a base therefor, of a rotary disk eccentrically mounted in the bottom of the hopper, a seed-dropping ring surrounding and detachably connected to said disk and provided on its periphery with radial seed slots or receptacles, rotary stirrer-arms concentrically mounted in the hopper above the seed-dropping ring and carrying shoes arranged to sweep over the seed-slots, and means for rotating the seed-dropping ring and stirrer-arms in opposite directions, substantially as described.

12. In a seed-planter, the combination with a hopper and a base therefor, of a rotary disk eccentrically mounted in the bottom of the hopper and provided at its edge with projecting tongues, a seed-dropping ring surrounding said disk and provided at its inner edge with recesses in which said tongues fit, said seed-dropping ring being provided on its periphery with radial seed slots or receptacles, rotary stirrer-arms concentrically mounted in the hopper above the seed-dropping ring and carrying shoes arranged to sweep over the seed-slots, and means for rotating the seed-dropping ring and stirrer-arms in opposite directions, substantially as described.

13. In a seed-planter, the combination with a hopper and a base therefor, of a rotary disk eccentrically mounted in the bottom of the hopper and provided with a beveled periphery, projecting tongues on the periphery of the disk, a seed-dropping ring surrounding said disk and beveled on its inner edge and resting on the beveled edge of the disk, said ring having formed on its inner edge recesses in which the tongues fit and provided on its periphery with radial seed slots or receptacles, rotary stirrer-arms concentrically mounted in the hopper above the seed-dropping ring and crarying shoes arranged to sweep over the seed-slots, and means for rotating the seed-dropping ring and stirrer-arms in opposite directions, substantially as described.

14. In a seed-planter, the combination with a hopper and a base therefor, of a fixed circular boss disposed eccentrically in the bottom of the hopper, a vertical shaft journaled eccentrically in said boss and projecting centrally into the hopper, a disk supported rotatably about the boss, a seed-dropping ring surrounding and detachably connected to the disk and provided on its periphery with radial seed slots or receptacles, stirrer-arms mounted on the shaft above the seed-dropping ring and carrying shoes arranged to sweep over the seed-slots, and means for rotating the shaft and seed-dropping ring in opposite directions, substantially as described.

15. In a seed-planter, the combination with a hopper and a base therefor, of a fixed circular boss eccentrically disposed in the bottom of the hopper, a vertical shaft journaled eccentrically in said boss and projecting centrally into the hopper, a disk supported rotatably about the boss and provided on its under side with a beveled gear, a washer fastened over the boss to hold the gear-disk down, a seed-dropping ring surrounding and detachably connected to the disk and provided on its periphery with radial seed slots or receptacles, stirrer-arms mounted on the shaft above the seed-dropping ring and carrying shoes arranged to sweep over the seed-slots, a beveled gear fixed on the lower end of the shaft, and a beveled driving gear-wheel disposed between the gearing with the beveled gears on the disk and shaft, substantially as described.

16. In a seed-planter, the combination with a hopper and an annular base therefor, of a cross-bar straddling the base and having formed thereon a circular boss eccentrically disposed in the bottom of the hopper, a vertical shaft journaled eccentrically in said boss and projecting centrally into the hopper, a disk supported rotatably about the boss and provided on its under side with a beveled gear, a seed-dropping ring surrounding and detachably connected to the disk and provided on its periphery with radial seed slots or receptacles, stirrer-arms mounted on the shaft above the seed-dropping ring and carrying shoes arranged to sweep over the seed-slots, a beveled gear fixed on the lower end of the shaft, and a beveled driving gear-wheel disposed between and gearing with the beveled gears on the disk and shaft, substantially as described.

17. In a seed-planter, the combination with a hopper and an annular base therefor provided with a depending cup-shaped housing or casing, of a cross-bar straddling the base and having formed thereon a circular boss eccentrically disposed in the bottom of the hopper, a vertical shaft journaled in said boss and projecting centrally into the hopper, a disk supported rotatably about the boss and provided on its under side with a beveled gear, a seed-dropping ring surrounding and detachably connected to the disk and provided on its periphery with radial seed slots or receptacles, a conical disk mounted on the shaft above the seed-dropping ring and operating to stir and work the seed into the seed-slots, a beveled gear fixed on the lower end of the shaft, and a beveled driving gear-wheel disposed between and gearing with the beveled gears on the disk and shaft, substantially as described.

18. In a seed-planter, the combination with a hopper and an annular base therefor, of a fixed circular boss eccentrically disposed in the bottom of the hopper, a vertical shaft journaled eccentrically in said boss and projecting centrally into the hopper, a disk supported rotatably about the boss and provided on its under side with a beveled gear, a seed-dropping ring surrounding and detachably connected to the disk and provided on its periphery with radial seed slots or receptacles, a conical disk movably mounted on the shaft above the seed-dropping ring and provided with radial stirrer-arms carrying spring-shoes, a pin loosely passing through the conical disk and through a vertical slot in the shaft, a spring arranged to bear on the upper end of the conical disk, and means for rotating the conical disk and seed-dropping rings in opposite directions, substantially as described.

19. In a seed-planter, the combination with an annular base provided at its forward edge with a crescent-shaped flange, of a cylindrical hopper mounted eccentrically on said base, a seed-dropping ring rotatably arranged over said base and provided at its periphery with radial seed slots or receptacles, stirrer-arms arranged concentrically in the hopper above the seed-dropping ring and carrying shoes arranged to sweep over the seed-slots, and means for rotating the stirrer-arms and seed-dropping ring in opposite directions, substantially as described.

20. In a seed-planter, the combination with an annular base provided at its forward edge with an upwardly-projecting crescent-shaped flange and recessed at its rear edge, of a cylindrical hopper mounted eccentrically on said base and cut away on its rear lower edge above the recessed portion of the base, a seed-dropping ring rotatably arranged over said base and provided on its periphery with radial seed slots or receptacles, stirrer-arms arranged concentrically in the hopper above the seed-dropping ring and carrying shoes constructed to sweep over the seed-slots, and means for rotating the stirrer-arms and seed-dropping ring in opposite directions, substantially as described.

21. In a seed-planter, the combination with an annular base provided at its forward edge with an upwardly-projecting crescent-shaped flange and recessed at its rear edge, of a cylindrical hopper mounted eccentrically on said base and cut away at its lower rear edge above the recessed portion of the base, a seed-dropping ring rotatably arranged over said base and projecting at its rear edge through the cut-away portion of the hopper, said ring being provided at its periphery with radial seed slots or receptacles, a vertically-adjustable gate for closing the cut-away portion of the hopper, stirrer-arms arranged concentrically in the hopper above the seed-dropping ring and carrying shoes arranged to sweep over the seed-slots, and means for rotating the stirrer-arms and seed-dropping ring in opposite directions, substantially as described.

22. In a seed-planter, the combination with an annular base provided at its forward edge with an upwardly-projecting crescent-shaped flange having upturned lugs on its periphery and recessed at its rear edge, of a cylindrical hopper mounted on said base and fitted at its lower edge between the said lugs and flange, said hopper being cut away at its lower rear edge above the recessed portion of the base, a seed-dropping ring rotatably arranged over said base and projecting at its rear edge through the cut-away portion of the hopper, said ring being provided at its periphery with radial seed slots or receptacles, stirrer-arms arranged concentrically in the hopper above the seed-dropping ring and carrying shoes arranged to sweep over the seed-slots, and means for rotating the stirrer-arms and seed-dropping ring in opposite directions, substantially as described.

23. In a seed-planter, the combination with an annular base provided at its forward edge and at one side with upwardly-projecting flanges, of a cylindrical hopper mounted on said base and cut away at its rear lower edge above the recessed portion of the base, a seed-dropping ring rotatably arranged over said base and projecting at its rear edge through the cut-away portion of the hopper, said ring being provided at its periphery with radial seed slots or receptacles, stirrer-arms arranged concentrically in the hopper above the seed-dropping ring and carrying shoes constructed to sweep over the seed-slots, and means for rotating the stirrer-arms and seed-dropping ring in opposite directions, substantially as described.

24. In a seed-planter, the combination with a hopper and a base therefor, of a rotatable seed-dropping ring arranged eccentrically in the bottom of the hopper and projecting rearward thereof and provided at its periphery with radial seed slots or receptacles, a reel journaled in the rear of the hopper and provided with forwardly-projecting arms adapted to successively pass through the seed-slots, and means for causing said reel to rotate in unison with the seed-dropping ring, substantially as described.

25. In a seed-planter, the combination with a hopper and a base therefor, of a rotatable seed-dropping ring arranged eccentrically in the bottom of the hopper and projecting rearward thereof, said ring being provided on its periphery with radial seed slots or receptacles, a reel journaled on a horizontal support in rear of the hopper and provided with forwardly-projecting arms adapted to successively pass through the seed-slots, and mechanism for communicating rotary motion from the seed-dropping ring to the reel, substantially as described.

26. In a seed-planter, the combination with a hopper and a base therefor, of a rotatable seed-dropping ring arranged eccentrically in the bottom of the hopper and projecting rearward thereof, said ring being provided on its periphery with radial seed slots or receptacles, a reel journaled on a horizontal support in rear of the hopper and provided with forwardly-projecting arms adapted to successively pass through the seed-slots, and a spur-wheel fixed to rotate with the reel and its arms being arranged to successively engage the seed-slots in the seed-dropping ring, substantially as described.

27. In a seed-planter, the combination with a hopper and a base therefor, of a rotatable seed-dropping ring arranged eccentrically in the bottom of the hopper and projecting rearward thereof, said ring being provided at its periphery with radial seed slots or receptacles, a spur-wheel journaled on a horizontal support in rear of the hopper and having arms arranged to successively engage the seed-slots and punch the seed down and out of the slots, substantially as described.

28. In a seed-planter, the combination with a hopper and a base therefor, of a rotatable seed-dropping ring arranged eccentrically in the bottom of the hopper and projecting rearward thereof, said ring being provided at its periphery with radial seed slots or receptacles, a horizontal journal in rear of the hopper and at an angle to the radius thereof, a spur-wheel journaled on said journal and having arms arranged to successively engage the seed-slots, a reel fixed on the axis of the spur-wheel, and forwardly-projecting arms carried by the reel and arranged to successively pass downward through the seed-slots, substantially as described.

29. In a seed-planter, the combination with a hopper and a base therefor, of a rotatable seed-dropping ring arranged eccentrically in the bottom of the hopper and projecting rearward thereof, said ring being provided at its periphery with radial seed slots or receptacles, a horizontal journal projecting rearwardly from the hopper and at an angle to the radius of the latter, a spur-wheel journaled on said journal and having arms arranged to successively engage the seed-slots, a reel fixed on the axis of the spur-wheel, and forwardly-projecting brushes fixed on the ends of the arms of the reel and arranged to successively pass downward through the seed-slots, substantially as described.

30. In a seed-planter, the combination of a hopper, seed-dropping mechanism arranged in the bottom of the hopper, sifting mechanism arranged in the hopper above the seed-dropping mechanism, and means for actuating the seed dropping and sifting mechanism, substantially as described.

31. In a seed-planter, the combination of a hopper, rotary seed-dropping mechanism arranged in the bottom of the hopper, a vertical shaft arranged centrally in the hopper, rotary sifting mechanism fixed on the shaft above the seed-dropping mechanism, and means for rotating said shaft and sifting mechanism, substantially as described.

32. In a seed-planter, the combination of a hopper, rotary seed-dropping mechanism arranged in the bottom of the hopper, a screen fixed in the upper part of the hopper, a vertical shaft in the center of the hopper and projecting through said screen, stirrer-arms fixed on the shaft above the screen, and means for rotating the shaft and seed-dropping mechanism, substantially as described.

33. In a seed-planter, the combination with a cultivator, of a seed-dropping mechanism carried by the cultivator-beams, and two conical rollers arranged in rear of the seed-dropping mechanism, said rollers being disposed at an angle to each other with their smaller ends adjacent to one another, substantially as described.

34. In a seed-planter, the combination with a cultivator, of a seed-dropping mechanism carried by the cultivator-beams, and two conical rollers arranged in rear of the seed-dropping mechanism, said rollers being disposed at an angle to each other with their smaller ends adjacent to one another, one end of one of the rollers being arranged in advance of the corresponding end of the other roller, substantially as described.

35. In a seed-planter, the combination with a cultivator, of a seed-dropping mechanism carried by the cultivator-beams, and two conical rollers arranged in rear of the seed-dropping mechanism, said rollers being arranged at an angle toward each other in the direction of the line of draft, the smaller end of one of the rollers being disposed in advance of the corresponding end of the other roller, substantially as described.

36. In a seed-planter, the combination with a cultivator-frame, of a seed-dropping mechanism carried by the beams thereof, two conical rollers arranged in rear of the seed-dropping mechanism, said rollers being disposed at an angle to one another with the smaller end of one roller disposed in advance of the corresponding end of the other roller, and means for adjusting said rollers both angularly and horizontally, substantially as dedescribed.

37. In a seed-planter, the combination with a cultivator-frame, of a seed-dropping mechanism carried by the frame, two conical rollers arranged in rear of the seed-dropping mechanism, said rollers being disposed at an angle to one another with the smaller end of one roller disposed in advance of the corresponding end of the other roller, and means for adjusting the angle of said rollers, substantially as described.

38. In a seed-planter, the combination with a cultivator-frame, of a seed-dropping mechanism carried by the beams of the cultivator, two approximately horizontal spindles pendent from the beams in rear of the seed-dropping mechanism and disposed at an angle to one another, and conical rollers journaled on said spindles, each of said rollers comprising two frusto-conical shells screwed together, the larger shell being journaled on its spindle, substantially as described.

39. A covering-roller for seed-planters, consisting of two frusto-conical shells screwed together at their meeting ends, the larger shell being centrally provided with a longitudinal sleeve constructed for the reception of a spindle, and the smaller shell being closed at its outer end, substantially as described.

In testimony whereof I have hereunto set my hand in presence of two subscribing witnesses.

WILLIAM H. LEDBETTER.

Witnesses:
W. I. ADDISON,
A. S. LAIRD.